March 4, 1924.

C. W. ADAMS

CONNECTION FOR CARBON BRUSHES AND THE LIKE

Filed April 25, 1923

1,485,942

INVENTOR
Charles W. Adams

BY
ATTORNEYS

Patented Mar. 4, 1924.

1,485,942

UNITED STATES PATENT OFFICE.

CHARLES W. ADAMS, OF SAGINAW, MICHIGAN, ASSIGNOR TO THE UNITED STATES GRAPHITE COMPANY, OF SAGINAW, MICHIGAN, A CORPORATION OF MICHIGAN.

CONNECTION FOR CARBON BRUSHES AND THE LIKE.

Application filed April 25, 1923. Serial No. 634,602.

*To all whom it may concern:*

Be it known that I, CHARLES W. ADAMS, a citizen of the United States, residing at Saginaw, in the county of Saginaw and State of Michigan, have invented a new and useful Improvement in Connections for Carbon Brushes and the like.

My invention relates to that class of electrical connections which are especially useful in uniting flexible metallic conductors, commonly made of copper strands and known as "pig-tails," to carbon graphite or metal graphite brushes or blocks adapted for use as brushes on commutators of electric motors and generators and the like, although my invention may be employed in other connections, such as for battery electrodes, for example.

The object of my invention is to provide an inexpensive construction which shall give a more perfect electrical connection and one which at the same time is stronger mechanically than those heretofore used. This object I attain in the manner which I will now describe.

Figure 1:
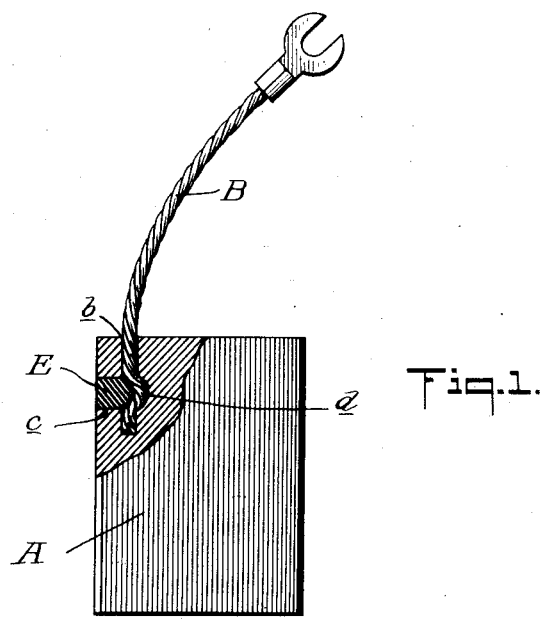
Figure 2:
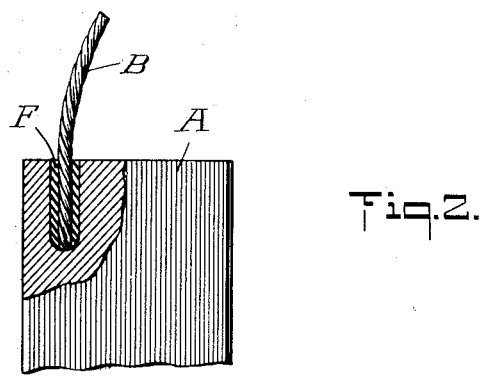

In the accompanying drawings, I have shown for the sake of illustration two forms of mechanically connecting a flexible "pig-tail" to a carbon brush, Fig. 1 being a side elevation partly in section showing one form, and Fig. 2 being a similar view showing another form.

In these figures, A is the block of carbon in which is formed a hole of suitable size to receive the end of the stranded or braided pig-tail B. In the construction Fig. 1, there is formed a hole $b$ in the carbon block of a size to receive with a snug fit the end of the pig-tail B, and there is formed in the side of the block, another hole $c$, which crosses transversely through the hole $b$ so as to produce a recess $d$ beyond the hole $b$. The result is that when the end of the pig-tail has been put into the hole $b$, and the securing material E (hereinafter described) is packed or tamped into the hole $c$, the pig-tail end will be bent and thereby mechanically held with extra security by the shoulders thus afforded.

In the construction shown in Fig. 2, one straight hole is formed in the carbon block A to receive the end of the pig-tail B, but in this case the hole is of a diameter somewhat larger than that of the pig-tail, so that the securing material F may be tightly packed around the end of the pig-tail, which is preferably in the form of a stranded cable, as indicated.

Among other so-called "cements" which have heretofore been used as the material to secure flexible conductors of the kind here under consideration to carbon brushes or the like, have been spongy copper and copper amalgam. Both these materials offer the objection that they introduce an undue amount of electrical resistance in the circuit, and do not give as strong a mechanical connection as is desirable.

I have found that a connection offering less electrical resistance and at the same time affording greater mechanical strength can be secured, yet at reduced cost, by using what is commercially known as "hammered" copper powder and subjecting this powder to treatment with sal ammoniac, or other cleanser under conditions which will free the copper from oil, oxides, and other impurities on the surfaces of the particles of copper.

While I prefer to use a substantially pure copper, analyzing about 99% copper, there may be alloyed or otherwise combined with the copper, some zinc, or lead or tin or other metal without departing from my invention. I shall therefore use the term copper in this specification in a somewhat general sense.

The copper is, as I have said, in the form known commercially as hammered copper powder, and I prefer to have it of 200 mesh fineness, but the powder may be finer or coarser than that, as desired.

This powder is now subjected to the action of a cleansing agent, such as sal ammoniac,—that is, ammonium chloride. The preferred mode of treatment is to thoroughly mix about 16 parts of this copper powder with 1 part of ammonium chloride and heat it in an enclosed container to about 400° C. The material is preferably brought up to this temperature slowly, say in about two and a half hours. It may then be held at this temperature for another two and a half hours, making a total heating time of five hours. While I have found these times, temperatures and proportions to give satisfactory results, they may be varied.

During this treatment under heat, practically all the products of reaction pass off as gas, leaving the particles of copper cleaned free of oily films and oxides, so that the particles of copper are in the best condition to adhere to each other. In fact, after the treatment the material when cooled down to room temperature, is usually found in the form of relatively large lumps, particles of the powder having become somewhat matted together.

I then re-pulverize this treated copper in a suitable machine, such as a ball mill, and I screen it to get uniform size, preferably to pass 100 mesh.

The powder thus obtained is free from oils, oxides and other foreign surface materials which would interfere with the adherence of the particles to each other when packed into place, or which would lessen the electrical conductivity of the packed mass. While to the naked eye, the material has the appearance of fine powder, the particles have much of the flaky character which was imparted to them by the original hammering process, as can be seen on magnification.

This cleansed powder is packed or tamped into the hole prepared for it in the carbon block to make a complete electrical and mechanical connection of the pig-tail to the carbon block, as shown for example at E in Fig. 1, and at F in Fig. 2 of the drawings.

While I prefer to cleanse the copper powder by the use of sal ammoniac, it will be understood that other agents for effecting the removal of the oil and oxides may be employed.

In the following claims I use the phrase "carbon block" in a sufficiently general sense to embrace blocks or brushes of carbon, graphite and metal graphite.

I claim as my invention:

1. A carbon block having a hole therein and a metallic electrical conductor in the hole with a securing and connecting means therefor consisting of cleansed copper powder packed into position.

2. A carbon block having a hole therein and a metallic electrical conductor in the hole with a securing and electrical connecting means therefor packed into position and consisting of hammered copper powder cleansed of oxides and oil.

3. A carbon block having a hole therein and an electrical conductor in the hole with a securing means therefor, consisting of hammered copper powder, in flaky condition and cleansed and packed into position.

4. A carbon block having a hole therein and an electrical conductor in the hole with a securing means therefor, consisting of cleansed copper powder of a fineness adapted to pass a screen of about 100 mesh.

5. The mode herein described of uniting pigtails to carbon blocks, consisting in hammering copper to a powdered condition, subjecting this powder to the action of a cleansing agent and packing the pigtail into a hole in the carbon block by means of this cleansed copper powder.

In testimony whereof I have signed my name to this specification.

CHARLES W. ADAMS.